(12) United States Patent
Ueda et al.

(10) Patent No.: US 8,142,239 B2
(45) Date of Patent: Mar. 27, 2012

(54) POWER SUPPLY TERMINAL STRUCTURE

(75) Inventors: Minoru Ueda, Tokyo (JP); Takayuki Kumagai, Tokyo (JP); Yuuichi Hashimoto, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 174 days.

(21) Appl. No.: 12/596,396

(22) PCT Filed: Apr. 18, 2008

(86) PCT No.: PCT/JP2008/057565
§ 371 (c)(1),
(2), (4) Date: Nov. 18, 2009

(87) PCT Pub. No.: WO2008/130024
PCT Pub. Date: Oct. 30, 2008

(65) Prior Publication Data
US 2010/0093220 A1  Apr. 15, 2010

(30) Foreign Application Priority Data
Apr. 19, 2007  (JP) ................................. 2007-110302

(51) Int. Cl.
*H01R 4/48* (2006.01)
(52) U.S. Cl. .......................................... 439/862; 439/66
(58) Field of Classification Search .................. 439/862, 439/81, 66
See application file for complete search history.

(56) References Cited

U.S. PATENT DOCUMENTS

| 5,655,913 | A  | * | 8/1997  | Castaneda et al. | 439/66  |
|-----------|-----|---|---------|------------------|---------|
| 5,980,323 | A  | * | 11/1999 | Bricaud et al.   | 439/630 |
| 6,464,512 | B2 | * | 10/2002 | Morita           | 439/66  |
| 7,220,152 | B2 | * | 5/2007  | Jeong            | 439/862 |
| 7,306,494 | B2 | * | 12/2007 | Soh              | 439/862 |
| 7,341,485 | B2 | * | 3/2008  | Polnyi           | 439/591 |
| 7,938,698 | B1 | * | 5/2011  | Yu               | 439/862 |
| 2005/0112959 | A1 | * | 5/2005 | Lai             | 439/862 |

FOREIGN PATENT DOCUMENTS

| JP | 3187031 | 7/2001 |
| JP | 3251305 | 1/2002 |

* cited by examiner

*Primary Examiner* — Hien Vu
(74) *Attorney, Agent, or Firm* — Studebaker & Brackett PC; Donald R. Studebaker

(57) ABSTRACT

A contact terminal which prevents a load from being concentrated on the contact terminal portion thereof when a part is disposed on a substrate, to prevent contact terminals from being short-circuited even if stacked, thereby reducing the overall space requirement. A projection is formed on a terminal base and the movable range of a contact is limited by the projection, whereby the load that is conventionally concentrated on a terminal support part can be distributed by a support part and the projection. Consequently, the durability of the terminal portion can be enhanced, the space for the contact terminal portion is saved, and a short circuit is prevented from occurring due to the contacting between the contact terminals.

2 Claims, 3 Drawing Sheets

POWER SUPPLY TERMINAL STRUCTURE

TECHNICAL FIELD

The present invention relates to a terminal structure of a substrate mounting type part such as a multifunction vibration actuator.

BACKGROUND ART

Currently, in fields of a substrate mounting type part mounted in a mobile communication apparatus or the like, as the result of downsizing all parts, resistance against oscillation of a terminal portion thereof due to the movement of a user is required.

With respect to such a requirement, as a mounting structure for preventing relative oscillation of an vibration actuator by a mounting member, there is a structure described in Japanese Patent No. 3251305 (hereinafter, referred to as Patent Document 1) for improving the reliability of the electrical connection of the vibration actuator to a mobile telephone body and facilitating the assembling thereof. In Patent Document 1, an elastic holder having a projection at a position facing a power supply terminal in addition to the above-described structure is formed so as to obtain effect that the life span of the terminal is prolonged by reducing friction between the terminal and a power supply land.

In addition, independent of Patent Document 1, as a terminal structure in which an elastic member having a projection is disposed at a position facing a power supply terminal and the elastic member simultaneously configures a mounting portion, there is a structure described in Japanese Patent No. 3187031 (hereinafter, referred to as Patent Document 2). In Patent Document 2, unlike Patent Document 1, by elastically supporting the power supply terminal, oscillation suppression effect that the oscillation of the power supply terminal is suppressed is added.

In addition to the above-described effects, in Patent Document 2, by adding the elastic member to the power supply terminal, it is possible to protect the power supply terminal from plastic deformation when impact is received when dropping.

However, in Patent Document 1, since the vibration actuator is mounted in a casing by the mounting member and the vibration actuator is fixed using the elastic member, the oscillation of the vibration actuator is attenuated.

In addition, in Patent Document 2, in addition to the problem of Patent Document 1, since the power supply terminal is inserted between the vibration actuator and the power supply land, the oscillation is attenuated in both the elastic member and the power supply terminal.

In addition, in Patent Document 2, since the power supply terminal is used as the oscillation suppression member, it is difficult to reduce the dimension thereof in a contact direction. As a result, the dimension of a mounted mobile communication apparatus is increased.

SUMMARY OF THE INVENTION

The present invention is contrived to solve the above-described problems. An object of the present invention is to provide a terminal structure capable of saving a space of an overall terminal portion and realizing stable connection without attenuating oscillation when an vibration actuator is driven.

In order to solve the above-described problems, a structure in which spring terminals are brought into contact with terminal base projections formed on the rear surface of the spring terminals when the spring terminals arranged on the same straight line in the same direction in parallel are brought into contact with a power supply land is used. By using such a structure, it is possible to distribute a load which is concentrated on a support of the spring terminals by the large displacement of the spring terminals when the projections are not formed and to enhance the durability of the spring terminals.

In addition, since a total of two spring structures including a spring structure using the projections as a fulcrum and a spring structure using the support as a fulcrum is applicable to the spring terminal, it is possible to improve the reliability of the overall spring terminal.

In addition, since the movable range of the spring terminal is limited by the projections, even if the plurality of spring terminals is formed so as to be close to each other, it is possible to prevent the contact between the terminals and to prevent the short circuit due to the contact between the terminals.

In addition, by adding the mounting structure using a locking it is possible to facilitate assembling and to absorb deformation due to the bending of the spring terminals.

Further, by forming a spherical surface in the contact portion of the terminal structure described above, the contact with the power supply land becomes a point contact, thereby obtaining good conductive characteristics.

DETAILED DESCRIPTION OF THE INVENTION

Hereinafter, best embodiments of the present invention will be described with reference to FIGS. 1, 2 and 3.

Figure 1:
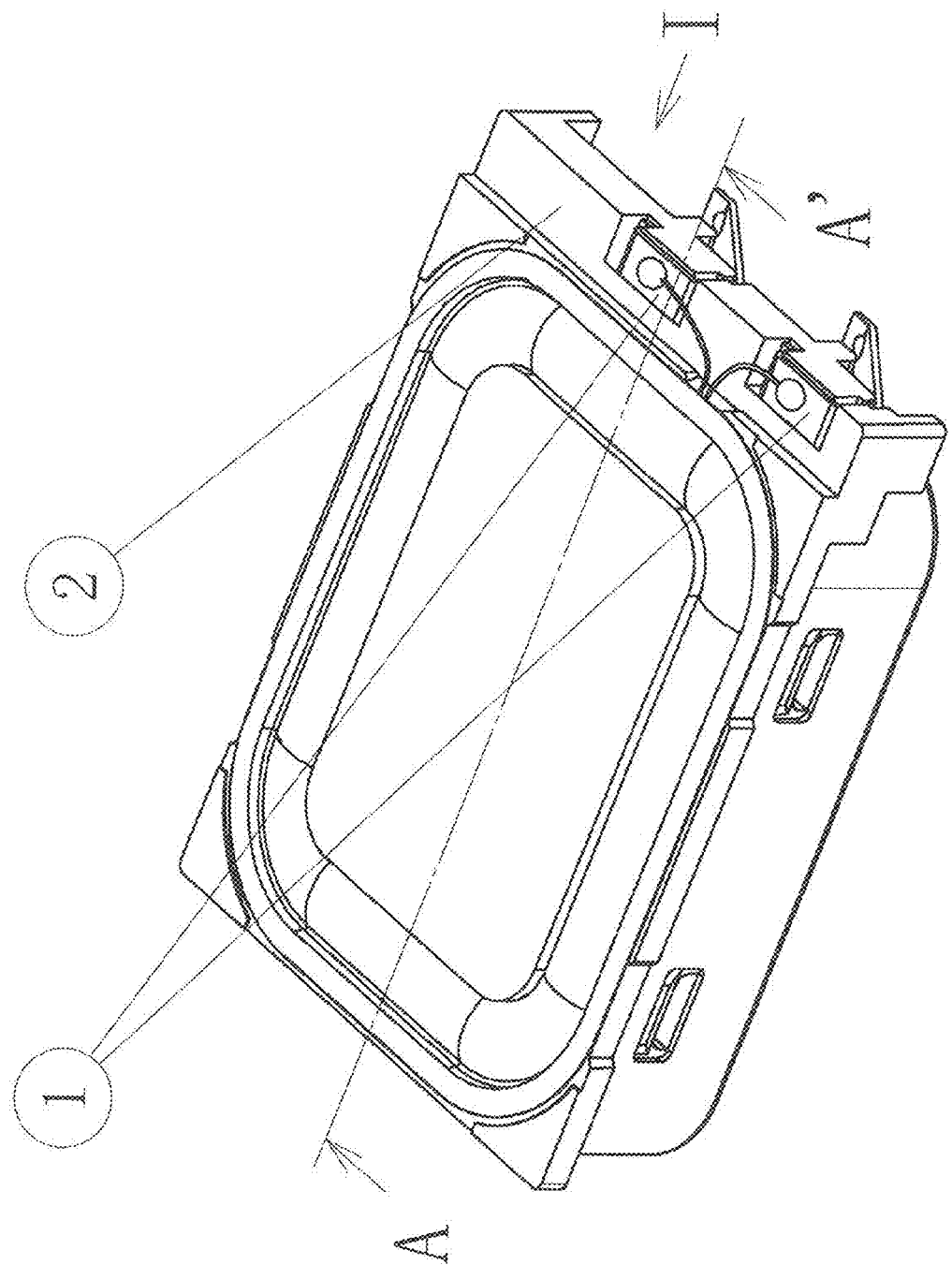
FIG. 1 is a perspective view of a multifunction vibration actuator used in the present embodiment.

FIG. 1 is a perspective view of a multifunction vibration actuator, in which a terminal structure is formed, used in the present embodiment. FIG. 2 is a side cross-sectional view taken along line A-A' of FIG. 1. FIG. 3 is a side view of the multifunction vibration actuator shown in FIG. 1 when viewed in an I direction.

Figure 2:
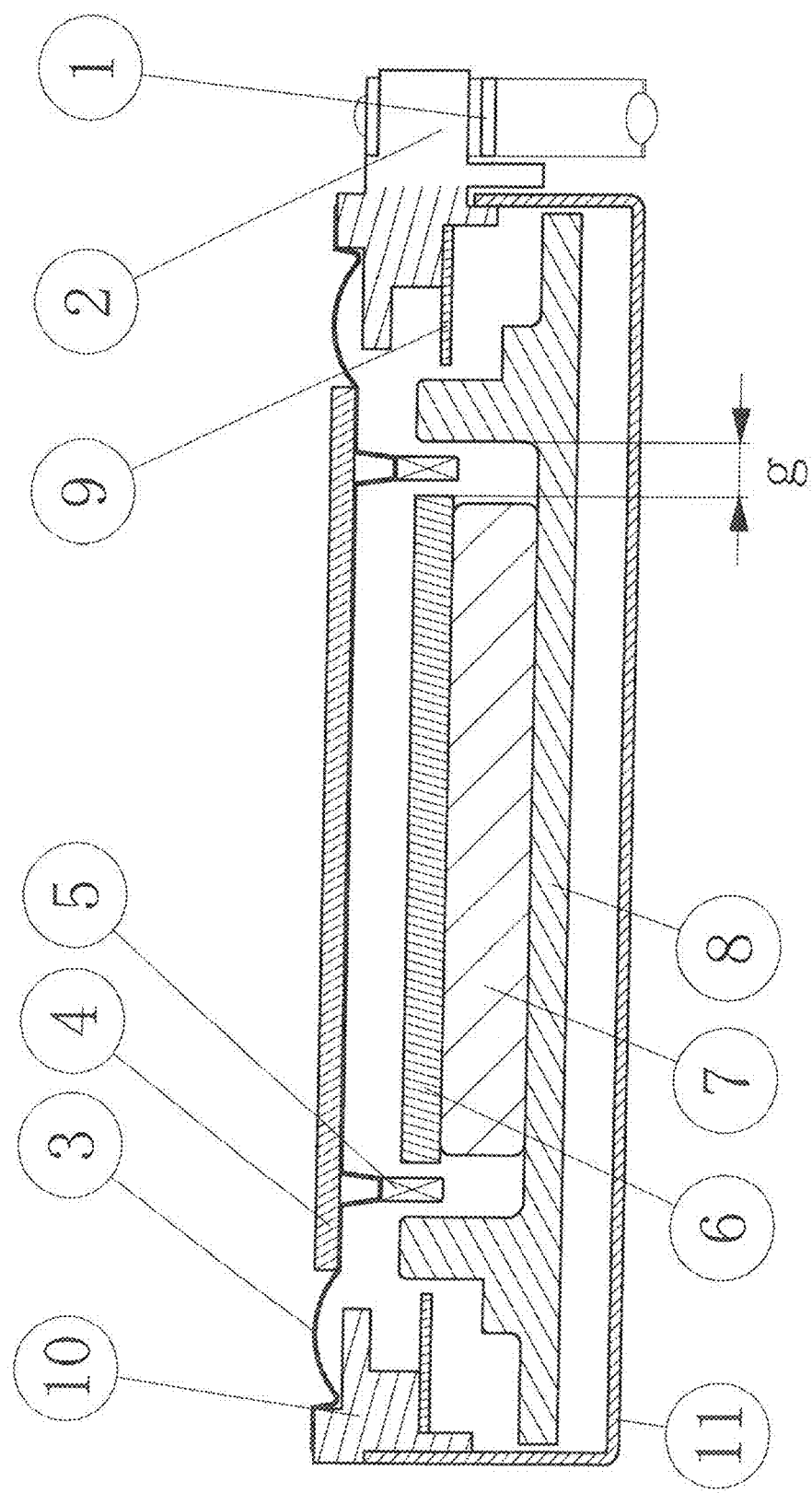
FIG. 2 is a side cross-sectional view taken along line A-A' of FIG. 1.

As shown in FIGS. 1 and 2, in the present embodiment, using a magnetic force generated by an input to a voice coil 5, with respect to the multifunction vibration actuator which obtains an acoustic reproduction and body sensible oscillation occurrence function by driving a diaphragm including a diaphragm base portion 3 having the voice coil 5 attached thereto and a diaphragm central portion 4 and a magnetic circuit portion configured by inserting a magnet 7 magnetized in a thickness direction between a pole piece 6 and a yoke 8, the terminal structure of the present invention is used.

In more detail, as shown in FIG. 1, lead-out line ends of the voice coil are adhered to spring terminals 1 such that the input of signals from the ends of the spring terminals 1 to the voice coil 5 disposed in a magnetic gap g formed by a magnetic circuit portion is possible. In addition, by using the signals near resonance frequencies of the magnetic circuit portion supported by a suspension 9 and the diaphragm shown in FIG. 2, a structure in which acoustic reproduction and body sensible oscillation occur is realized. In addition, a configuration in which a housing 10 and a terminal base 2 are integrally molded so as to close an opening by the diaphragm and to close an opening of an opposite side thereof by a cover 11 is used.

Figure 3:
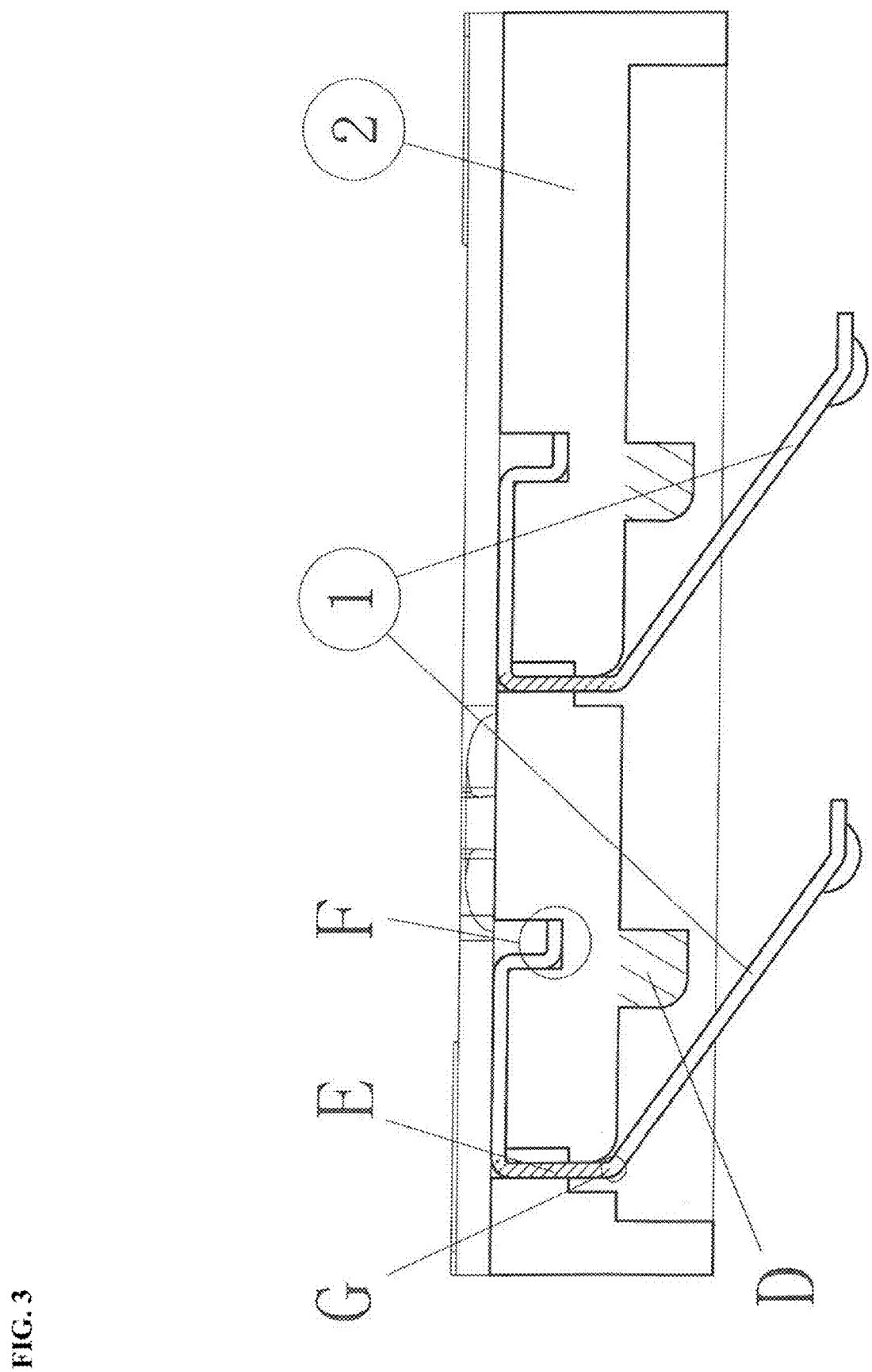
FIG. 3 is a side view of the multifunction vibration actuator used in the present embodiment.

In addition, as shown in FIGS. 1 and 3, a configuration in which contact terminals of the present embodiment are locked by the terminal base 2 and locking portions F so as to form spherical contacts in front ends of the spring terminals 1 each configured by a leaf spring is used. Accordingly, the effect such as stable power supply can be obtained by a structure in which power is received by point contact upon mounting on a substrate.

In addition, by forming projections D, it is possible to use a pressurization force due to a spring structure using a bending portion G as a fulcrum and a spring structure using the projections D using a fulcrum when mounting on the substrate and to enhance the durability of all the spring terminals.

By a structure in which the displacement of a spring terminal support is limited by the projections D, it is possible to distribute a load that is concentrated on the bending portions G of the spring terminals and to enhance the durability of the spring terminals 1. In addition, by forming the projections D on the terminal base, the movable range of the spring terminals 1 is limited so as to prevent the short circuit from occurring due to the contact between the terminals.

In addition, in the present embodiment, since a part is directly mounted on a mounting substrate, driving is realized without attenuating oscillation upon the occurrence of body sensible oscillation.

As described above, by the terminal structure described in the present embodiment, it is possible to downsize the terminal portion of the multifunction vibration actuator described in the present embodiment and to enhance the durability of the terminal portion.

It is therefore apparent that there has been provided, in accordance with the present invention, a power supply terminal structure and particularly a terminal structure of a substrate mounting type part such as a multifunction vibration actuator. While this invention has been described in conjunction with a preferred embodiment, it is evident that many alternatives, modifications, and variations would be or are apparent to those of ordinary skill in the application arts. Accordingly, the disclosure is intended to embrace all such alternatives, modifications, equivalents any variations that are within the spirit and scope of this invention.

What is claimed is:

1. A terminal structure comprising:
   a terminal base having an upper end and a lower end;
   at least two terminal base locking portions disposed on the upper end of the terminal base;
   at least two downward projections spaced apart and formed from a surface of the lower end of the terminal base, the projections are disposed in tandem in a plane;
   at least two spring terminals spaced apart and disposed in tandem and in the same plane as that of the at least two projections,
   each of the at least two spring terminals having a back end and a front end,
   each back end includes a locking portion to engage with one of the terminal base locking portions, and each of the front end includes a contact portion which is to be brought in contact with a corresponding power supply portion on a substrate;
   wherein each of the at least two projections provides a fulcrum for each of the at least two spring terminals to bend such that the contact portion on each of the spring terminals is pressurized when being brought into contact with the corresponding power supply portion on the substrate;
   wherein the back end of each of the at least two spring terminals is locked by one of the locking portions formed on upper end of the terminal base.

2. The terminal structure according to claim 1, wherein a spherical surface is formed in a front end of the contact portion of the spring terminal.

* * * * *